UNITED STATES PATENT OFFICE.

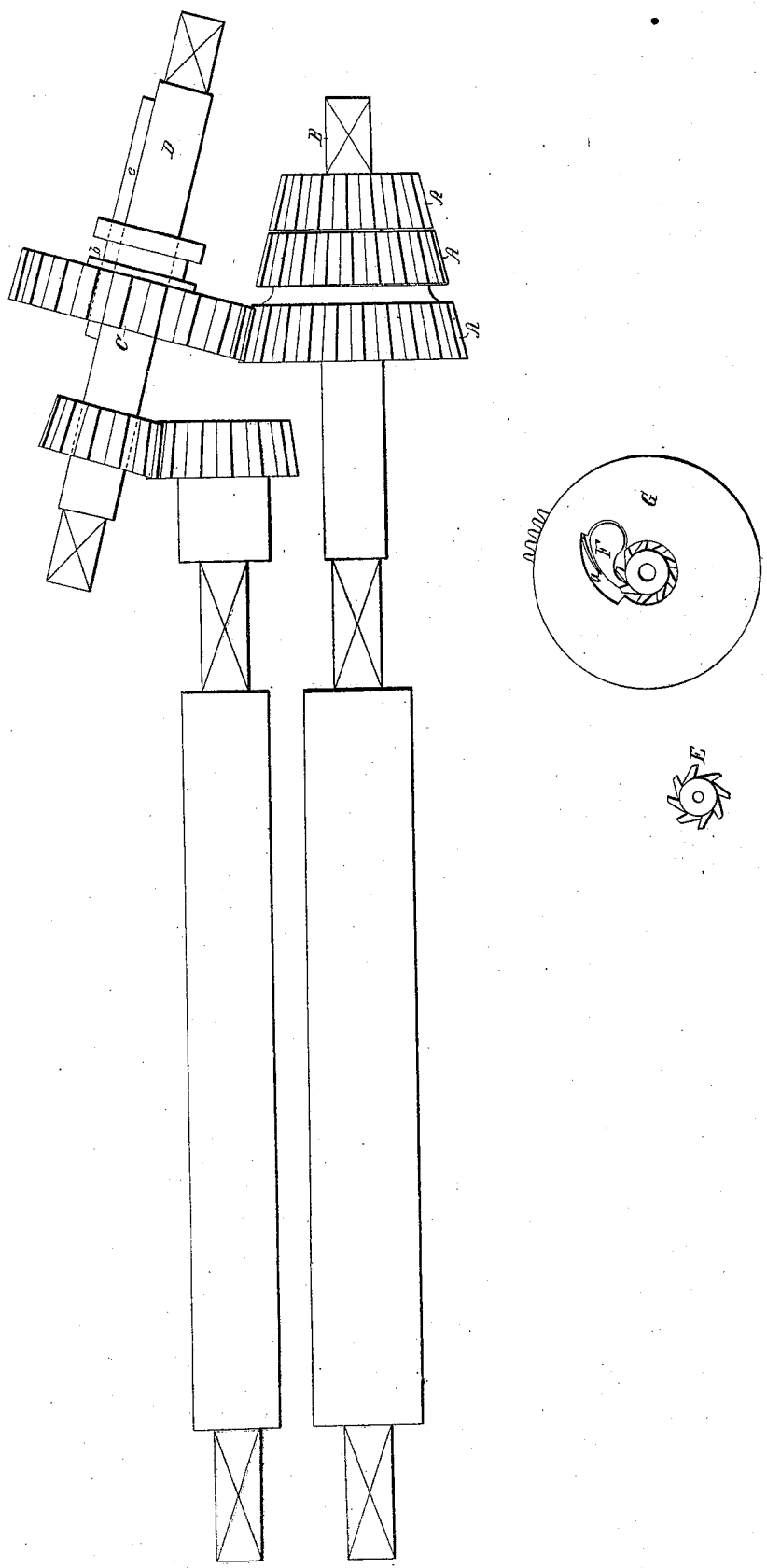

JOHN EVANS AND JAMES H. THOMPSON, OF PATERSON, NEW JERSEY.

CHANGEABLE GEARING.

Specification of Letters Patent No. 5,085, dated April 24, 1847.

*To all whom it may concern:*

Be it known that we, JOHN EVANS and JAMES H. THOMPSON, of Paterson, in the county of Passaic and State of New Jersey, have invented a new and useful improvement in the mode or manner of changing the speed of rollers or the speed of any machinery required to be changed by gearing while running or in motion, and that the following is a full and exact description thereof, reference being had to the annexed drawing making a part of this specification, in which is shown the application of said invention to a railway drawing frame for cards.

The letters A, A, A, represent three wheels each having a different number of teeth from the other, so that by sliding the wheel C (the motion of which is uniform) from one to another of the wheels A, A, A, a change is effected in the speed of the shaft or roller B. The wheels A, A, A, revolve freely on the shaft B, in one direction, but by means of a catch, dog or tumbler attached to each of said wheels as represented by Figure G, (which is an end view of one of the wheels A, A, A,) and by means of corresponding flutes, nicks, notches or grooves upon the shaft B, where the wheels A, A, A, are placed upon it, the shaft or roller B, is made to revolve at an increased or diminished speed according as the driving wheel is applied to the different wheels A, A, A.

Letter G, represents an end view of one of the wheels on shaft B, with the dog or tumbler, which allows it to revolve freely on the shaft B, in one direction while the sliding wheel C, is passing from one of the wheels A, A, A, to another, but when the wheel is driven in the other direction the dog or tumbler applies itself to the notches or grooves upon the shaft B, and gives it the same rotary motion with the wheel A.

Letter *a*, is a small spring designed to prevent the dog, or tumbler F from falling out of the notches or grooves on the shaft B.

C, represents a wheel so adjusted upon the shaft D, as to slide longitudinally upon the shaft backward and forward, so that it may be appled to either of the wheels A, A, thus increasing or diminishing the speed of the shaft or roller B.

Letter *b*, represents the groove or collar connected with the wheel C, where the guide or lever is applied to change the position of the sliding wheel C, on its shaft, so as to bring it to bear upon either of the wheels A, A, A, as an increased or diminished speed may be required.

Letter *e* represents a tongue firmly attached to the shaft D made to fit a corresponding groove in the wheel C, which prevents the wheel from revolving on its shaft, and facilitates the operation of sliding the wheel C backward and forward on the shaft so as to bring it to bear upon either of the wheels A, A, A.

Letter E, is a section of the shaft or roller B, showing the notches or grooves upon the shaft, to which the dog or tumbler F is applied for the purpose of giving to the shaft or roller a forward rotary motion, the same with that of the several wheels A, A, A, as they may be respectively driven by the sliding wheel C.

The change of the speed of rollers, or of any machinery while in motion, is effected by placing two, three, or more wheels together forming a cone of different sized wheels and fluting, niching, notching or grooving the shaft or roller, or parts where the said wheels are placed and putting catches, dogs or tumblers in the several wheels so as to catch and hold in the said flutes, nicks, notches or grooves, when required to drive, and to slip and revolve backward when required to do so, in order to permit the driving wheel to slide from one of the said wheels to another, or by attaching the said catches, dogs, or tumblers to the shaft on which the said wheels revolve and making the flutes, nicks, notches or grooves in the said several wheels.

What we claim as our own invention and not previously known in the above described improvement is—

The mode, or manner of placing several different sized wheels upon a shaft and by means of catches, dogs or tumblers attached inside of the said wheels or attached to the shaft upon which the wheels revolve and by means of flutes, nicks, notches or grooves upon the said shaft, or upon the inside of said wheels, so that said wheels are made to
5 slide, or revolve backward, to permit the driving wheel to slide or pass from one of said wheels to another, thus increasing or diminishing the speed without breaking teeth or causing the machinery or gearing to stop while the change of speed is going on. 10

JOHN EVANS.
JAMES H. THOMPSON.

Witnesses:
S. D. CANFIELD,
GEO. M. STIMSON.